(12) United States Patent
Wei et al.

(10) Patent No.: US 11,784,976 B1
(45) Date of Patent: Oct. 10, 2023

(54) SYSTEM AND METHOD FOR SECURE DATA TRANSFER

(71) Applicant: AVIATRIX SYSTEMS, INC., Santa Clara, CA (US)

(72) Inventors: Xiaobo Sherry Wei, Palo Alto, CA (US); Ramakrishnan Kunnath, Milpitas, CA (US); Arvind Sreekumar, Santa Clara, CA (US)

(73) Assignee: Aviatrix Systems, Inc., Santa Clara, CA (US)

( * ) Notice: Subject to any disclaimer, the term of this patent is extended or adjusted under 35 U.S.C. 154(b) by 71 days.

(21) Appl. No.: 17/010,822

(22) Filed: Sep. 2, 2020

Related U.S. Application Data

(60) Provisional application No. 62/907,493, filed on Sep. 27, 2019.

(51) Int. Cl.
| | |
|---|---|
| *H04L 9/40* | (2022.01) |
| *G06F 9/455* | (2018.01) |
| *H04L 12/46* | (2006.01) |
| *H04L 67/1097* | (2022.01) |
| *H04L 67/51* | (2022.01) |
| *H04L 67/50* | (2022.01) |
| *H04L 67/1001* | (2022.01) |

(52) U.S. Cl.
CPC .......... *H04L 63/0272* (2013.01); *G06F 9/455* (2013.01); *H04L 12/4641* (2013.01); *H04L 63/04* (2013.01); *H04L 63/08* (2013.01); *H04L 63/102* (2013.01); *H04L 63/20* (2013.01); *H04L 67/1001* (2022.05); *H04L 67/1097* (2013.01); *H04L 67/51* (2022.05); *H04L 67/535* (2022.05)

(58) Field of Classification Search
CPC . H04L 63/0272; H04L 12/4641; H04L 63/04; H04L 63/08; H04L 63/102; H04L 63/20; H04L 67/1002; H04L 67/1097; H04L 67/16; H04L 67/22; H04L 67/1001; H04L 67/51; G06F 9/455
See application file for complete search history.

(56) References Cited

U.S. PATENT DOCUMENTS

| | | | |
|---|---|---|---|
| 9,473,298 B2 | 10/2016 | Wante | |
| 9,654,508 B2 | 5/2017 | Barton | |
| 10,142,226 B1 * | 11/2018 | Wu | ........................ H04L 45/586 |

(Continued)

OTHER PUBLICATIONS

U.S. Appl. No. 17/010,820, filed Sep. 2, 2020 Advisory Action dated Aug. 22, 2022.

(Continued)

*Primary Examiner* — Ramy M Osman
(74) *Attorney, Agent, or Firm* — Winstead PC

(57) ABSTRACT

In one embodiment, a secure exchange system is described. The secure exchange system includes a virtual private cloud network and a controller. The virtual private cloud network includes a plurality of gateways, each gateway of the plurality of gateways is configured to generate one or more local directories. Each local directory of the one or more local directories representing one or more stored objects within a public cloud storage element. The controller is configured to authenticate a user prior to granting the user (Continued)

access to the virtual private cloud network. The gateways are accessible by the user over AWS Direct Connect, where the public cloud storage element is a S3 bucket.

19 Claims, 5 Drawing Sheets

(56) References Cited

U.S. PATENT DOCUMENTS

| | | | | |
|---|---|---|---|---|
| 10,147,251 | B1* | 12/2018 | Phillips | G06F 21/88 |
| 10,387,381 | B1* | 8/2019 | Patwardhan | G06F 16/164 |
| 10,503,918 | B2* | 12/2019 | Byszio | H04L 63/0435 |
| 2009/0125522 | A1* | 5/2009 | Kodama | H04L 63/083 |
| | | | | 707/999.009 |
| 2012/0221668 | A1* | 8/2012 | Chen | G06F 16/176 |
| | | | | 709/212 |
| 2014/0040479 | A1* | 2/2014 | Dunn | H04L 67/1008 |
| | | | | 709/226 |
| 2014/0149794 | A1* | 5/2014 | Shetty | G06F 16/951 |
| | | | | 709/213 |
| 2014/0337961 | A1* | 11/2014 | Chien | H04L 63/10 |
| | | | | 726/12 |
| 2014/0359704 | A1* | 12/2014 | Chen | H04L 63/08 |
| | | | | 726/3 |
| 2016/0088092 | A1* | 3/2016 | Cardona-Gonzalez | |
| | | | | H04L 67/10 |
| | | | | 709/227 |
| 2016/0261564 | A1* | 9/2016 | Foxhoven | H04L 63/0272 |
| 2016/0321459 | A1* | 11/2016 | Byszio | H04L 61/4511 |
| 2018/0146037 | A1* | 5/2018 | Figueroa | H04L 67/1097 |
| 2018/0309843 | A1* | 10/2018 | Chandra | H04L 67/55 |
| 2018/0373439 | A1* | 12/2018 | Xu | H04L 67/1097 |
| 2019/0005065 | A1* | 1/2019 | Debnath | G06F 16/185 |
| 2020/0302542 | A1* | 9/2020 | Yelovitch | G06Q 40/08 |
| 2020/0311034 | A1 | 10/2020 | Brand | |
| 2020/0341947 | A1* | 10/2020 | Aziz | G06F 16/1774 |

OTHER PUBLICATIONS

U.S. Appl. No. 17/010,820, filed Sep. 2, 2020 Final Office Action dated Jun. 15, 2022.

U.S. Appl. No. 17/010,820, filed Sep. 2, 2020 Non-Final Office Action dated Mar. 4, 2022.

* cited by examiner

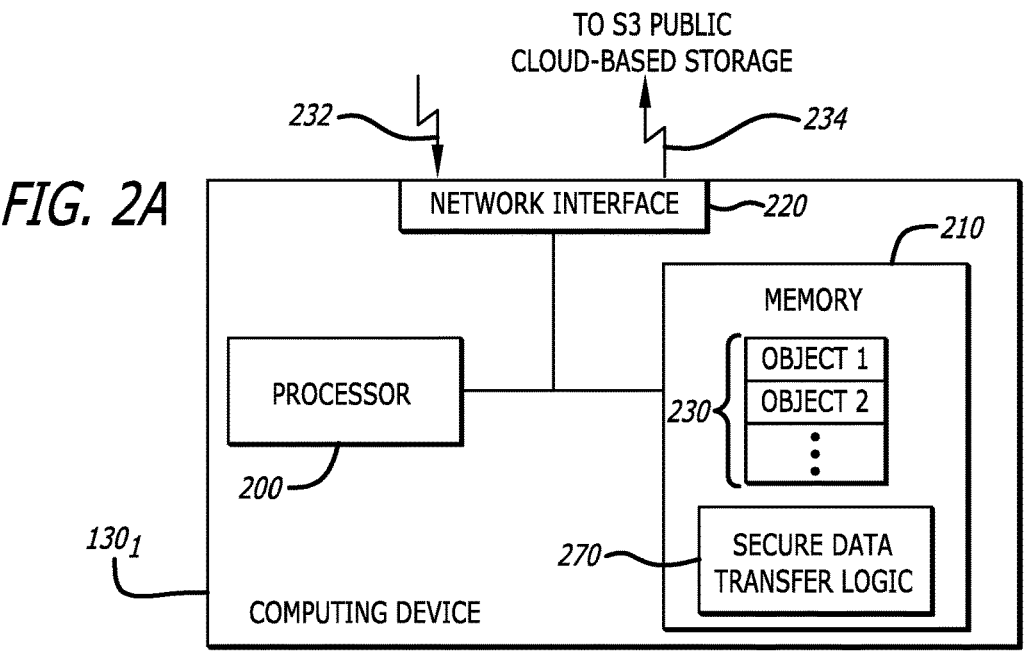
FIG. 2A
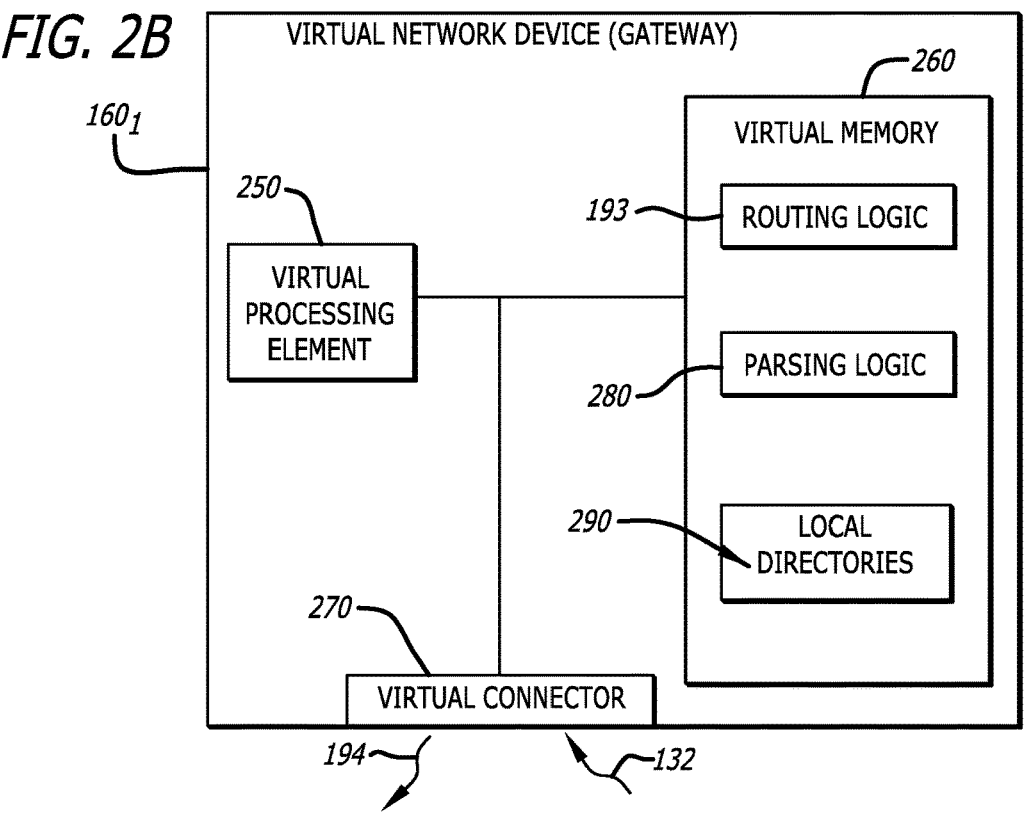
FIG. 2B
FIG. 2C

SYSTEM AND METHOD FOR SECURE DATA TRANSFER

CROSS-REFERENCE TO RELATED APPLICATIONS

This application claims the benefit of priority on U.S. Provisional Patent Application No. 62/907,493 filed Sep. 27, 2019, the entire contents of which are incorporated by reference herein.

FIELD

Embodiments of the disclosure relate to the field of networking. More specifically, one embodiment of the disclosure relates to a system and method for transferring data between storage services within a public cloud network and one or more on-premises computing devices.

GENERAL BACKGROUND

Over the past few years, cloud computing has provided an Infrastructure as a Service (IaaS), where resources are provided as part of a cloud computing platform (e.g., public cloud network) and made accessible to users (e.g., administrators, end users, etc.) as a service. One of these services allows users to upload data to a public-cloud storage service, in particular one or more cloud storage elements such as Simple Storage Service (S3) buckets provided by AMAZON WEB SERVICES™ (AWS). In some cases, the S3 buckets are accessible via a high-speed communication link such as AWS's "Direct Connect" for example.

Herein, Direct Connect is a cloud service solution that supports a dedicated network connection from on-premises networked devices to AWS. More specifically, Direct Connect may be used to provide a dedicated, high-speed network connection between networked devices operating as part of an on-premises network (e.g., enterprise network) and one of the AWS Direct Connect locations that are part of the global AWS public cloud. Relying on virtual local area networks (VLANs), such as industry standard IEEE 802.1q VLANs for example, this dedicated connection can be partitioned into multiple virtual interfaces. Hence, the same connection may be used to access different resources such as different S3 buckets at a particular storage region.

For example, Direct Connect can be leveraged for high-speed copying of objects to and/or high-speed retrieving of objects from selected S3 buckets. Since S3 is a public service, the current standard solution for establishing Direct Connect with an on-premises ("on-prem") network is to use a public virtual interface (VIF) to advertise the entire S3 public address range to users of the on-prem networked devices. As a result, all on-prem users are able to upload data to any of their S3 buckets, including their personal S3 buckets on their own personal account. Stated differently, Direct Connect currently fails to offer any access control mechanisms to prevent data leakage, namely the possibility that a user intentionally or accidentally sending company confidential data to his or her personal (user) S3 bucket in lieu of S3 buckets designated to the company.

Greater controls in data transfer to public cloud storage services are needed.

BRIEF DESCRIPTION OF THE DRAWINGS

Embodiments of the invention are illustrated by way of example and not by way of limitation in the figures of the accompanying drawings, in which like references indicate similar elements and in which:

FIG. 2A is a detailed diagram of the exemplary embodiment of the computing device of FIG. 1;

FIG. 2B is a detailed diagram of the exemplary embodiment of a virtual network device operating as a gateway within a virtual private cloud with a dedicated (private) connection to the on-premises network over Direct Connect;

FIG. 2C is an exemplary embodiment of a displayable image of the local directories associated with different portions of the public cloud-based storage;

DETAILED DESCRIPTION

Figure 1:
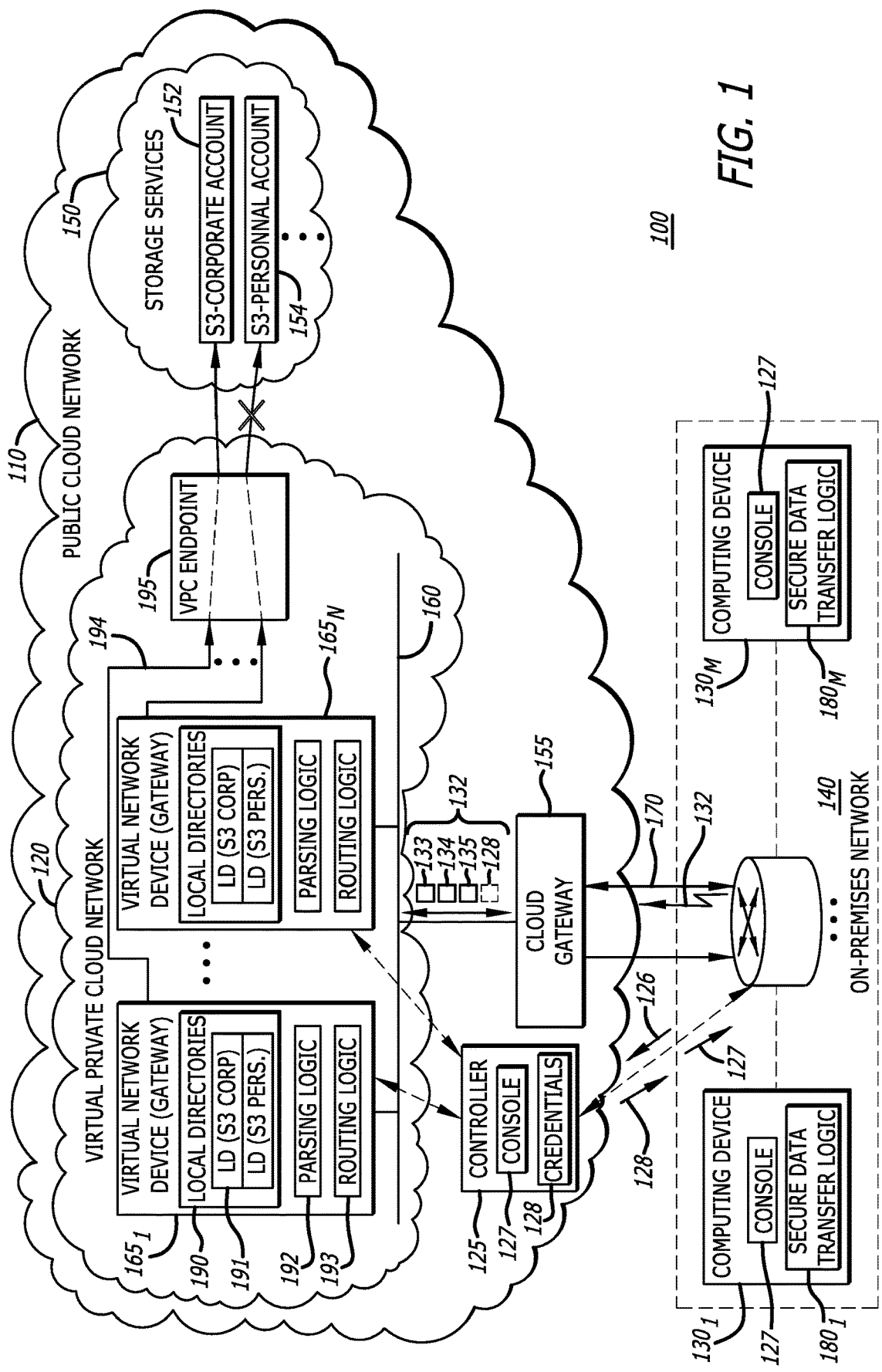
FIG. 1 is a diagram of a first exemplary embodiment of a secure exchange system that supports communications between a computing device deployed within an on-premises network and a public cloud storage service.

Embodiments of a secure exchange system and corresponding method for supporting a secure transfer (e.g., an upload or download) of objects over a dedicated communication link (e.g., AWS's Direct Connect) between one or more computing devices deployed within an on-premises network (hereinafter, "on-prem computing device(s)") and a public cloud storage service (e.g., AWS S3 storage). Herein, according to one embodiment of the disclosure, the secure exchange system includes (i) secure data transfer logic deployed within or accessible to an on-prem computing device and (ii) one or more gateways residing within a virtual private cloud (VPC) that are accessible by the on-prem computing devices via load balancing logic (hereinafter, "gateway selector"). As described below, the secure data transfer logic provides a user with controlled access to the S3 storage via Direct Connect, the gateway selector and a selected gateway. According to another embodiment of the disclosure, the secure exchange system feature the one or more gateways residing within a spoke VPC (e.g., a VPC to which the Direct Connect does not terminate) or these gateway(s) may be deployed as spoke gateway(s) in communication with the transit gateway provided by AWS into which the Direct Connect terminates.

The secure exchange system further includes a controller and a logical gateway provided by the cloud provider (hereinafter, "cloud gateway"). Accessible by an administrator of the on-premises network, the controller is configured to authenticate the administrator prior to granting access to the secure exchange system. The controller further includes credentials for use in establishing communications with the one or more gateways as described below. The cloud gateway operates as a termination point for the Direct Connect connectivity between the VPC and the on-premises network.

Based on the above-described system architecture, the secure data transfer logic enables its user to leverage Direct Connect to transfer objects (e.g., files, documents, programs or other types of content) between one or more on-prem computing devices and S3 storage without reliance on the public virtual interface (VIF). Additionally, the secure data transfer logic along with the gateway selector and/or gateways provide access controls to allow the user (or network administrator) to (i) select which cloud storage element (e.g., dedicated storage elements as S3 buckets) is to receive an object from an on-prem computing device for storage and (ii) select from which S3 bucket objects can be retrieved for return to a requesting on-prem computing device. The secure exchange system supports multiple users, multiple AWS accounts, and multiple S3 buckets.

According to one embodiment of the disclosure, the secure data transfer logic is a software tool stored within a non-transitory storage medium. The non-transitory storage medium is accessible to or deployed within an on-prem computing device. When executed, the secure data transfer logic is configured to provides a user (e.g., owner, employee, network administrator, etc.) with control into which S3 bucket(s) an object from a particular on-prem computing device is stored and from which S3 bucket an object is retrieved for return to the on-prem computing device. The secure data transfer logic is in communications with the gateway selector (sometimes referred to as a "network load balancer"), which is configured to select a gateway residing within the VPC to handle the storage or retrieval of the object.

More specifically, the secure exchange system operates by launching a selected gateway or a plurality of gateways in the VPC. The plurality of gateways are communicatively coupled to the gateway selector. The gateway selector is configured to select a particular gateway of the plurality of gateways to handle interactions with the S3 storage initiated by the secure data transfer logic during a communication session. This selection of the particular gateway may be based, at least in part, on the current workload (e.g., number of open communication sessions, data transfer rate currently supported, etc.) handled by each of the gateways.

The gateway selector is communicatively coupled to the cloud gateway deployed within the public cloud network. The cloud gateway operates as a termination point for a dedication communication link (e.g., Direct Connect) prior to entry into the VPC. As an alternative embodiment, where a single gateway is provided, the gateway may be communicatively coupled to the on-prem network via Direct Connect without the need of a gateway selector that is assigned its own private Internet Protocol (IP) address.

In accordance with one operation of the secure exchange system, each gateway in the VPC is configured to provide the secure data transfer logic with access to information that, when rendered, generates one or more local directories for display by an on-prem computing device. Each of the local directories corresponds to a S3 bucket maintained as part of a cloud storage service so as to allow for customer selection of one or more S3 buckets that are available to the authenticated user. More specifically, each S3 bucket appears as a mounted local directory on each gateway, where each local directory may be assigned the same name or substantially similar name as a corresponding S3 bucket (e.g., local directory name includes additional indicia (e.g., one or more added characters, symbols, etc.) and/or removes certain indicia from the corresponding S3 bucket names). The similar name designation enables the user to more easily identify which S3 bucket corresponds to the local directory selected by the user for storage or retrieval of an object. Each object (e.g., file, document, application, image, etc.) stored in a selected S3 bucket may be subsequently represented as a stored object within that selected S3 directory.

A VPC endpoint is a logical routing element to serve S3 storage so that a user-inintiated data transfer is transferred entirely within the cloud provider's infrastructure (AWS backbone). Stated differently, the VPC endpoint enables the transfer of an object between a particular gateway and a selected S3 bucket. As a result, data may be copied from an on-prem computing device to one or more S3 buckets, each represented as a local directory, without incurring costs for that data transfer. Hence, each object stored in a selected S3 bucket may be represented as a stored object within the a similarly named local directory.

In accordance with this embodiment, for controlling which users are authorized to access which local directories and/or which VPC endpoints, policies may be configured to restrict access by each gateway to certain S3 buckets. In fact, since only the mounted S3 buckets on the gateway can be used for data transfer, access controls are provided to effectively lock down which S3 bucket or S3 buckets are avavilable and from where data can be transferred. The access controls (or credentials) may be provided by the controller to one or more gateways after authentication of the user. These access controls apply to operations conducted during a communication session until that session has been terminated.

I. Terminology

In the following description, certain terminology is used to describe features of the invention. In certain situations, the term "logic" is representative of hardware, firmware, and/or software that is configured to perform one or more functions. As hardware, the logic may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Alternatively, or in combination with the hardware circuitry described above, the logic may be software in the form of one or more software modules. The software module(s) may include an executable application, an application programming interface (API), a subroutine, a function, a procedure, an applet, a servlet, a routine, source code, a shared library/dynamic load library, or one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code may be stored in persistent storage.

The term "computerized" generally represents that any corresponding operations are conducted by hardware in combination with software and/or firmware.

The term "computing device" may be construed as virtual or physical device. For instance, as an illustrative example, the computing device may correspond to a virtual device in the form of a software component (e.g., a virtual machine). Alternatively, in some embodiments, the computing device may correspond to physical device, such as an electronic device that is communicatively coupled to a network and assigned an Internet Protocol (IP) address. Examples of computing devices, residing as part of the "on-premises" (or local) network, may include, but are not limited or restricted to a personal computer (e.g., desktop, laptop, tablet or netbook), a mobile phone, a standalone appliance, a sensor, a virtual machone, or the like.

The term "gateway" may refer to a physical device or a software instance deployed within a cloud computing platform, such as a public cloud network for example, where the gateway at least controls the flow of data traffic from a virtual private cloud network (VPC) to one or more remote sites including computing devices that may process, store and/or continue the routing of data. For example, the terms "transit gateway" and "spoke gateway" may refer to gateways having similar architectures, but are identified differently based on their location/configurations within the VPC. For instance, a "transit" gateway may correspond to a logical instance that is configured to further assist in the propagation of data traffic (e.g., one or more messages) directed to a spoke gateway, namely a gateway in communication with the transit gateway to isolate workload.

The term "message" generally refers to information in a prescribed format and transmitted in accordance with a suitable delivery protocol. Hence, each message may be in the form of one or more packets, frames, command or series of commands, or any other series of bits having the prescribed format.

The term "transmission medium" may be construed as a physical or logical communication link between two or more devices. For instance, a physical communication link may include wired interconnects in the form of electrical wiring, optical fiber, cable, bus trace, or the like. A logical communication link may include a communication link between two virtual devices or perhaps a wireless channel relying on different frequency ranges such as a type of radio frequency (RF) or cellular frequency.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General Architecture

Referring to FIG. 1, a diagram of an exemplary embodiment of a secure exchange system 100 operating, at least in part, within a public cloud network 110 such as AMAZON WEB SERVICES™ (AWS) is shown. In particular, the secure exchange system 100 includes a virtual private cloud network (VPC) 120, which is communicatively coupled to (i) one or more computing devices $130_1$-$130_M$ operating within an on-premises network 140 and (ii) a cloud-based storage service 150. Herein, the cloud-based storage service 150 is a selected portion of AWS S3 storage (e.g., S3 buckets assigned to accounts accessible by the user). For example, as shown, the user may be authorized to access one or more S3 buckets associated with a company (e.g., S3 (corporate account) bucket 152) and/or one or more S3 buckets associated with personal use (e.g., S3 (personal account) bucket 154).

According to one embodiment of the disclosure, the controller 125 is accessible to both logic deployed within the VPC 120 and one or more computing device $130_1$, . . . or $130_M$ deployed in the on-premises network 140. Users permitted access to the VPC 120 may undergo a registration process and, after successful registration, the user may be assigned a selected type of identifier 126 (e.g., username/ passcode, biometric information, etc.). The identifier 126 (e.g., entire identifier, a portion of the identifier, a representation of the identifier such as hash value, etc.) is retained by the controller 125 for later authentication.

Any of the computing device $130_1$, . . . or $130_M$ may be configured to access and retrieve information from the controller 125 to render a console 127 on a display element associated with that computing device. The console 127 operates as an input/output (I/O) interface to (i) receive log-on information from the user (e.g., the user identifier 126 associated with the the computing device $130_1$, . . . or $130_M$) and (ii) authenticate the user to which access credentials 128 are assigned to allow the user to access to certain portions of the cloud-based storage service 150. The credentials 128 may be provided from the controller 125 to the on-prem computing device $130_1$, . . . or $130_M$ and/or to gateways $165_1$-$165_N$ (N≥1), described below.

Herein, the credentials may include access controls and permissions to perform certain operations. Examples of the controls and permissions may include, but are not limited or restricted List (request a visual of the directories), Read (e.g., obtain non-editable version of the object from an S3 bucket), Write (e.g., store an object within an S3 bucket), Retrieve (e.g., obtain editable version of the object from an S3 bucket), or other data manipulation commands.

The VPC 120 further includes a gateway provided by a cloud provider (hereinafter, "cloud gateway") 155 and gateway load balancing logic (hereinafter, "gateway selector") 160. The cloud gateway 155 is a logical cloud element used to terminate the Direct Connect 170. When a particular on-prem computing device $130_1$, . . . or $130_M$ (e.g., computing device $130_1$) attempts to gain access to a particular cloud storage element within the cloud-based storage services 150, the computing device 1301 issues an access message 132, which may includes a private IP address 133 of the gateway selector 160 along with a selected directory name 134 (e.g., targeted S3 bucket name) and/or user credentials 128 to gain access to a particular cloud storage element (e.g., S3 bucket). The access message 132 may further include a data transfer command 135 representating the type of access requested by the access message.

Herein, continuing this embodiment of the disclosure, the gateway selector 160 is responsible for selecting one of the plurality of gateways $165_1$-$165_N$ to handle interaction between the cloud-based storage service 150 and the computing device $130_1$. The selection process may be based on any number of workload distribution schemes such as (i) the workload currently handled by each of the gateway $165_1$ . . . or $165_N$ (e.g., logic within the gateway selector 160 maintains a count as to the number of queries being processed or communication sessions handled by each gateways) and/or (ii) one or more modulo operations on selected data within the access message 132 issued by the computing device $130_1$ (e.g., source address, etc.) and routed over Direct Connect 170, or the like.

Herein, according to one embodiment of the disclosure, where the computing devices $130_1$-$130_M$ operate separately (e.g., a decentralized arrangement), each computing device $130_1$ . . . or $130_M$ includes secure data transfer logic $180_1$ . . . or $180_M$ that is deployed therein or accessible thereto. For instance, with respect to operability of the computing device $130_1$ described herein for illustrative purposes, the secure data transfer logic $180_1$ is a software tool that enables its user to leverage Direct Connect 170 to exchange objects (e.g., files, programs, documents, folders, etc.) between the computing device $130_1$ and a selected S3 bucket accessible by the user of the computing device $130_1$ (e.g., S3 bucket 152). Stated differently, the secure data transfer logic $180_1$, operating in concert with a gateway (e.g., gateway $165_1$) chosen by the gateway selector 160, exchanges access control information that allows the user (or network administrator) to select a particular S3 bucket (e.g., S3 bucket 152, S3 bucket 154, etc.) into which the object is stored or into which the object is retrieved.

More specifically, the secure exchange system 100 operates by launching a gateway $165_1$ or a plurality of gateways $165_1$-$165_N$ in the VPC 120. The plurality of gateways $165_1$-$165_N$ are communicatively coupled to the gateway selector 160, which operates, at least in part, to select a particular gateway (e.g., gateway $165_1$) to handle the interaction with the cloud-based storage service 150.

Herein according to one embodiment of the disclosure, each gateway $165_1$, . . . or $165_N$ in the VPC 120 may be configured with access to one or more local directories 190 that are made available and accessible to users at the computing devices $130_1$-$130_M$. Each of these local directories 190 may be named to uniquely correspond to a S3 bucket (e.g., S3 bucket 152) of the cloud-based storage service 150 to which a user is authorized to access. Further, all of the objects maintained by that S3 bucket 152 are identified as accessible objects within the corresponding local directory. As an illustrative example, a first local directory 191 may correspond to the corporate-based S3 bucket 152 so that each object (e.g., file, program, document, etc.) maintained in the S3 bucket 152 is represented as a corresponding entry within the first local directory 191. Each gateway $165_1$-$165_N$ has access to all of the local directories 190, including the first local directory 191 corresponding to S3 bucket 152 to which the user credential 128 permits access.

Besides maintaining a copy of the S3 local directories 190, each gateway $165_1$, . . . or $165_N$ includes parsing logic 192 and routing logic 193. The parsing logic 192 is configured to receive the access message 132 and parse the content within the access message 132 to recover the local directory name 134 included in the access message 132 and/or the data transfer command 135 representing the type of S3 bucket access requested by the user. The routing logic 193 is configured to conduct a destination network address translation to generate an inter-cloud S3 access message 194. The inter-cloud S3 access message 194 is configured to control a VPC endpoint 195, namely routing logic, to serve one or more S3 buckets including the targeted S3 bucket (e.g., S3 bucket 152) over the public cloud network infrastructure (e.g., AWS infrastructure).

As further shown in FIG. 1, the VPC endpoint 195 is created by the controller 125 to serve one of more of the S3 buckets 152/154 maintained by the cloud-based storage service 150 so that data is transferred over the public cloud network infrastructure (e.g., AWS infrastructure) in lieu of over an Internet connection, as there are no incurred costs to transfer data within the public cloud network 110. Hence, objeccts may be copied from the computing device $130_1$ (and its corresponding storage locations) to the S3 bucket 152 corresponding to the local directory 191. For this embodiment, the VPC endpoint 195 enables private connectivity between the VPC 120 and the supported AWS services (e.g., S3 bucket 152) without requiring public IP addressing.

In accordance with this embodiment, using the computing device $130_1$, a user may select to store an object (e.g., file) within or retrieve an object (file) from a particular S3 bucket. Upon selection of the object within the particular S3 bucket for storage, the computing device $130_1$ may issue a first type of access message (e.g., Write (WR) command, etc.) for storage of the object within an S3 bucket. Similarly, the computing device $130_1$ may issue a second type of access message (e.g., Read (RD), etc.) for retrieval of the object from the particular S3 bucket. Upon receipt of the message, a gateway (e.g., gateway $165_1$) may be assigned to process messages from the computing device $130_1$ via Direct Connect 170 during this communication session.

Upon receipt of the access message 132, the gateway $165_1$ may be configured to parse the contents of the access message 132 to determine the local directory name (e.g., same or clear derivation of the S3 bucket name) included in the access message 132, a data manipulation command representative of the message 132, and/or user credentials 128. Where the user has not been authenticated to access the particular local directory (S3 bucket 152), the access message 132 is ignored. However, if the user has been authenticated based on the credentials 128, the assigned gateway $165_1$ conducts a destination address translation to generate the inter-cloud S3 access message 194 provided to the VPC endpoint 195 that is addressed to the S3 bucket(s) 152 and performs the operability of the received command. This message 194 enables the VPC endpoint 195 to access the particular S3 bucket 152 identified by the local directory name included within the access message 132. In fact, since each S3 bucket corresponds to a mounted local directory with access controls to restrict access to S3 buckets accessible with the credential 128, the secure data transfer is configured to effectively lock down which S3 bucket or buckets and from where data can be transferred (i.e. stored in or retrieved from).

Referring now to FIG. 2A, a detailed diagram of the exemplary embodiment of the computing device $130_1$ of FIG. 1 is shown. Herein, the computing device $130_1$ features a processor 200, a memory 210 and a network (communication) interface 220 configured for transmission of requests for storage and/or retrieval of objects 230 from selected S3 buckets. Herein, one or more of the objects 230 (hereinafter, "object(s)") may be processed by the processor 200 prior to re-storing of the object(s) 230 by the computing device $130_1$ into the S3 bucket (e.g., S3 (Corporate Account) Bucket 152).

Herein, the memory 210 includes secure data transfer logic $180_1$ that is configured to generate and render a dashboard including indicia identifying the contents of the local directories 190 of FIG. 1 that are available to the user of the computing device $130_1$. As stated above, each of the local directories 190 may uniquely correspond to a S3 bucket accessible by the user. As a result, after being authenticated by the controller 125 of FIG. 1 and granted access to the secure exchange system 100, the user is able to retrieve an object 232 (e.g., "object 1" of the object 230) from a particular S3 bucket to which the user is permitted access through credentials 128 issued by the controller 125. According to one embodiment of the disclosure, the retrieval may be accomplished by the user, via the dashboard operating as an I/O interface, selecting (e.g., double-clicking, select and drag, etc.) the object 232 within one of the local directories 190 representative of the particular S3 bucket. This causes the object 232 to be copied from contents in the particular S3 bucket and downloaded for storage within the on-prem computing device $130_1$.

Additionally, after being authenticated by the controller 125 and granted access to the secure exchange system 100, the user is able to store an object 234 ("object 2"), namely one of the objects 230 into a particular S3 bucket. According to one embodiment of the disclosure, the storage of the object 234 may be accomplished by the user, via the dashboard, selecting and dragging the object 234 for placement into the appropriate S3 bucket 152. This causes the content of the object 234, supplied from the on-prem computing device $130_1$, to be copied into the particular S3 bucket via the gateway selector 160 of FIG. 1, selected gateway $165_i$ (i=1 . . . or N) and/or VPC endpoint 195.

Referring to FIG. 2B, a detailed diagram of the exemplary embodiment of a virtual network device operating as the gateway $160_1$ within the VPC 120 of FIG. 1 communicatively coupled to the on-premises network 150 over Direct Connect 170 is shown. Herein, the gateway $160_1$ features a processor (e.g., a virtual processing element) 250, a memory (e.g., virtual memory) 260 and an interface (e.g., virtual connector) 270, which collective operate to process messages directed to the storage of an object into or retrieval of an object from a selected S3 bucket (e.g., S3 bucket 152).

According to one embodiment of the disclosure, the memory 260 maintains multiple local directories 190 that correspond to multiple S3 buckets (and the contents therein) accessible by a particular user as shown in FIG. 2C. Each S3 bucket may be represented as a displayable image 290 appearing as a mounted local directory on the gateway $160_1$. Each local directory 190 may be assigned the same (or substantially similar) name as the S3 bucket to assist in the translation from an access message from a computing device to a suitable inter-cloud S3 access message 194 as shown in FIG. 1.

Referring back to FIG. 2B, the gateway $160_1$ includes the parsing logic 192 and the routing logic 193. Upon receipt of an access message directed to retrieval of an object from a targeted S3 bucket, according to one embodiment of the disclosure, the parsing logic 192 is configured to recover the local directory name corresponding to the targeted S3 bucket. Additionally, as an optional feature when the credential 128 (see FIG. 1) is included in the access message 132, the parsing logic 280 may be further configured to extract the user credential 128 to confirm, by the routing logic 285, that the user is authorized to access the targeted S3 bucket.

The routing logic 285 is configured to communicate information associated with the incoming access message 132 to the VPC endpoint 195 (see FIG. 1). More specifically, given the names of the local directories 170 correspond to the names of the S3 buckets, the parsing logic 280 may determine the particular S3 bucket based on the received naming convention. The routing logic 285 performs a destination network address translation in order to generate the inter-cloud S3 access message 194 directed to an IP-address region utilized by the targeted S3 bucket (e.g., S3 (corporation account) buckets 152). The inter-cloud S3 access message 194 further operates to replicate operability of the data transfer command 135 associated with the access message 132. The routing logic provides the inter-cloud S3 access message 194 to the VPC endpoint 195 (not shown).

The VPC endpoint 195 of FIG. 1 is created and operates in cooperation with the gateways $165_1$-$165_N$, including the gateway $165_1$ as shown, to enables the transfer of the object 232 between the gateway $160_1$ and a selected S3 bucket without incurring costs for that data transfer as the data transfer is through the VPC endpoint 195 that is part of the VPC 120 and does not constitute a charged data transfer leaving the public cloud network infrastructure 110 of FIG. 1.

Figure 3A:
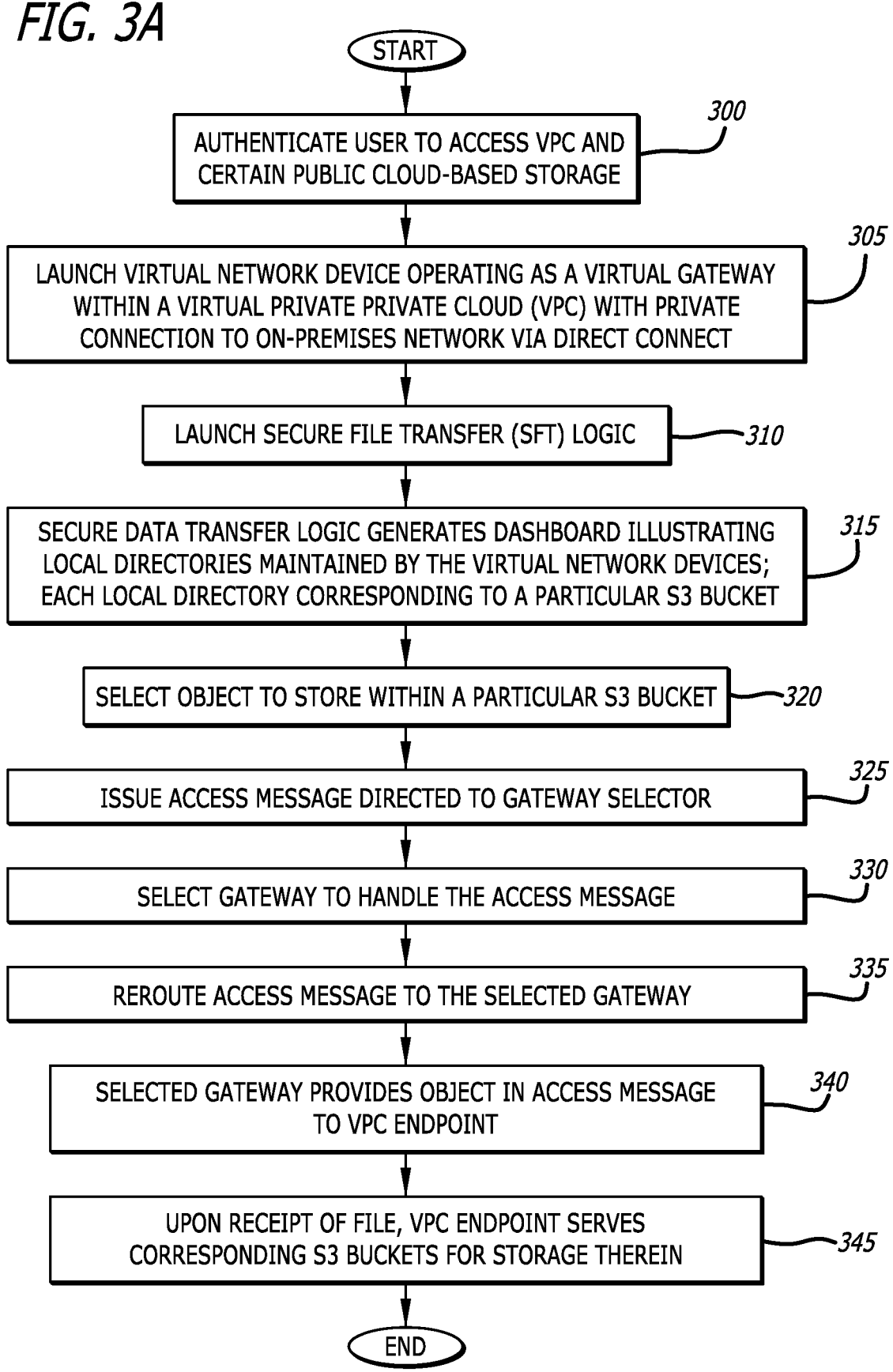
FIGS. 3A-3B are exemplary flowcharts illustrating the operations involved in conducting the secure transfer of content between the on-premises computing device and a virtual private cloud (VPC) endpoint associated with a particular S3 bucket.
Figure 3B:
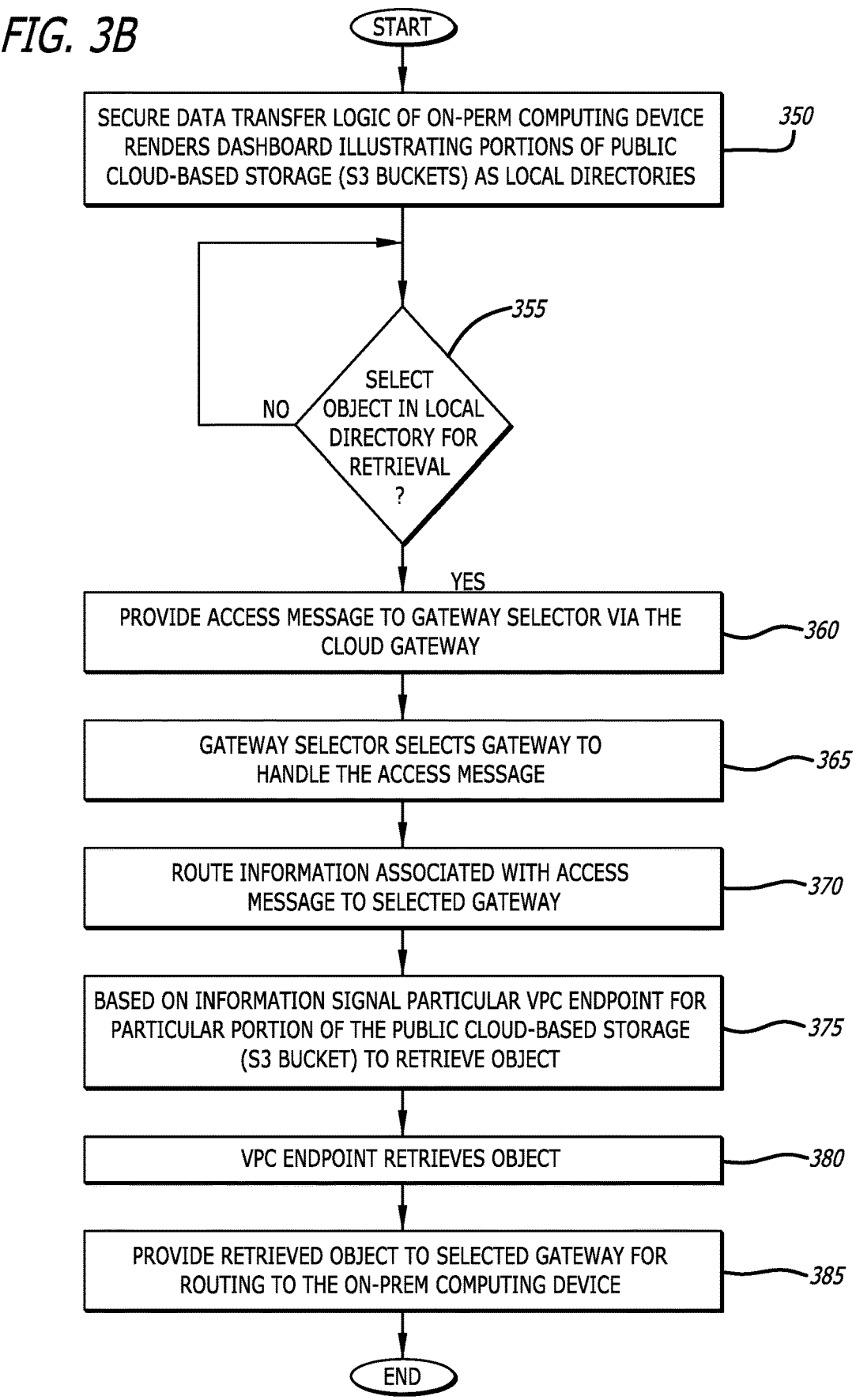

Referring now to FIGS. 3A-3B, exemplary flowcharts illustrating the operations involved in conducting the secure transfer of content between a on-premises computing device (e.g., computing device 1301) and the virtual private cloud (VPC) endpoint associated with a particular S3 bucket is shown. Herein, as shown in FIG. 3A, a user is authenticated to access a virtual private network, including a plurality of (virtual) network devices operating as gateways, a gateway selector, and a cloud gateway (operation 300). The gateways are launched to support communications with an on-premises network over a private connection, such as Direct Connect when the VPC is part of an AWS public cloud network (operation 305). Additionally, the secure file transfer logic, accessible to one or more computing devices operating within the on-premises network, is launched (operation 310). The secure file transfer logic is communicatively coupled to one of the gateways, as selected by the gateway selector, for accessing cloud-based storage via a selected gateway.

The secure file transfer logic is configured to generate and render a dashboard illustrating the S3 buckets, which are accessible to the user as local directories along with the objects maintained within each of the S3 buckets (operation 315). Upon selection of an object maintained locally on the on-prem computing device and issuance of an access message for storage of the object within a particular S3 bucket, identified as one of the local directories, the access message is directed to a private IP address associated with the cloud gateway (operations 320 and 325). The cloud gateway confirms authentication and re-routes to the gateway selector. Thereafter, for this communication session, the gateway selector selects, based on workload computations, a gateway to handle the request message and routes information associated with the access message to the selected gateway (operations 330 and 335).

Based on content within the request message (e.g., information representative of the selected S3 bucket), the selected gateway provides the object to a VPC endpoint associated with the particular S3 bucket (operation 340). The VPC endpoint serves the object to the particular S3 bucket for storage (operation 345).

Referring now to FIG. 3B, with respect to retrieving an object from a S3 bucket and provided the logic associated with the VPC is operation and the secure data transfer logic accessible by the on-prem computing device is also in operation, renders a dashboard illustrating the S3 buckets accessible to the user as local directories along with the objects maintained within each of the S3 buckets (operation 350). Upon selection of an object maintained locally on the on-prem computing device, an access message for retrieval of the object within a particular S3 bucket, identified as one of the local directories, is issued and provided to the cloud gateway for confirmation of authentication and re-routing to the gateway selector (operations 355 and 360). Thereafter, for this communication session, the gateway selector selects, based on workload computations, a gateway to handle the access message and routes information associated with the object retrieval message to the selected gateway (operations 365 and 370).

Based on content within the object retrieval message (e.g., information representative of the selected S3 bucket), the selected gateway signals a VPC endpoint associated with the particular S3 bucket to retrieve the identified object (operation 375). The VPC endpoint retrieves the object from the particular S3 bucket and provides the object to the selected gateway for return to the on-prem computing device (operations 380 and 385).

Figure 4:
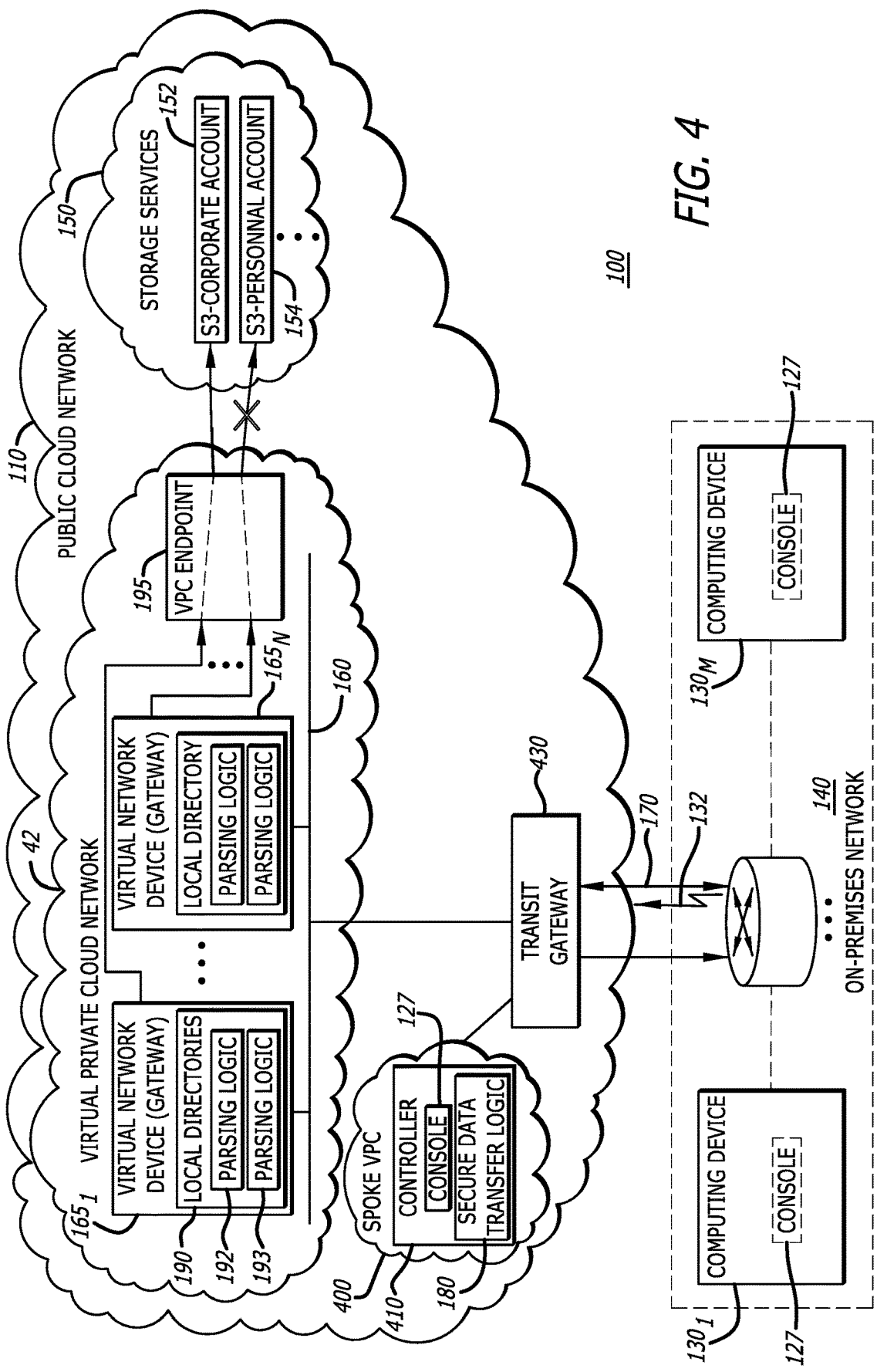
FIG. 4 is a diagram of a second exemplary embodiment of a secure exchange system with the secure file transfer functionality deployed within a transit gateway.

Referring now to FIG. 4, a block diagram of a second exemplary embodiment of the secure exchange system 100 with secure file transfer functionality deployed within a spoke virtual private cloud (VPC) 400 is shown. Herein, for this embodiment, the VPC 400 includes the gateway selector 160, the plurality of gateways $165_1$-$165_N$ and one or more VPC endpoints 195 as set forth in FIG. 1. However, in lieu of being deployed within the on-prem computing devices, the secure data transfer logic 180 may be deployed within the spoke VPC 400 such as functionality within a controller 410. Also, in lieu of a cloud gateway, the on-premises network 140 is communicatively coupled to a VPC 420 and the spoke VPC 400 through a transit gateway 430.

According to one embodiment of the disclosure, the on-prem computing device $130_1$-$130_M$ are configured, via a dedicated communication link (e.g., Direct Connect) 170, to access the controller 410 and receive signaling that is processed to render an image of a console (dashboard). The console may include images of local directories that correspond to the S3 buckets along with sub-images corresponding to objects stored within each of these S3 buckets. The operability of the storage and/or retrieval of objects from the S3 buckets is similar to the operability described in FIG. 1 through gateway selection, organization of the S3 bucket representation as local directories with similar name designations, and use of the VPC endpoint to interface with the S3 buckets within the S3 storage.

In the foregoing description, the invention is described with reference to specific exemplary embodiments thereof. However, it will be evident that various modifications and changes may be made thereto without departing from the broader spirit and scope of the invention as set forth in the appended claims.

What is claimed is:

1. A secure exchange system comprising:
a computing device deployed within an on-premises network and communicatively coupled to a virtual private cloud network;
the virtual private cloud network including a plurality of gateways, each gateway of the plurality of gateways is configured to generate routing logic and one or more local directories, wherein each local directory of the one or more local directories is within a gateway and corresponds to and represents a different public cloud storage element of a plurality of public cloud storage elements forming a public cloud storage service; and
a controller configured to authenticate a user prior to granting the user access to the virtual private cloud network, the controller communicatively coupled to each of the plurality of gateways to restrict access to at least one local directory of the one or more local directories in response to a failure to authenticate the user,
wherein the controller is configured to create a virtual private cloud (VPC) endpoint within a public cloud network infrastructure being logic that enables resources external from the secure exchange system to access the plurality of public cloud storage elements via the one or more local directories within each gateway of the plurality of gateways while maintaining a transfer of data only between the one or more local directories and the plurality of public cloud storage elements within the public cloud network infrastructure and preventing the transfer of data outside the public cloud network infrastructure and over an Internet connection,
wherein the routing logic is configured to communicate information associated with an incoming message relating to a storage element of the plurality of public cloud storage elements from the on-premises network and generate an inter-cloud message to access the storage element of the plurality of public cloud storage elements via the VPC endpoint,
wherein the generated inter-cloud message is between one of the local directories and the storage element.

2. The secure exchange system of claim 1, wherein the virtual private cloud network further comprises a gateway selector to select one of the plurality of gateways to apply a load balancing scheme directed toward communication sessions from the on-premises network to the plurality of public cloud storage elements forming the public cloud storage service.

3. The secure exchange system of claim 2, further comprising a dedicated communication link between the on-premises network and a cloud gateway of a public cloud network in which the virtual private cloud network resides, the cloud gateway communicatively coupled to the gateway selector.

4. The secure exchange system of claim 3, wherein the dedicated communication link is a Direct Connect link and each of the public cloud storage elements includes a Simple Storage Service (S3) bucket provided by AMAZON WEB SERVICES (AWS).

5. The secure exchange system of claim 1, wherein the controller further maintains and provides data transfer policies to each of the plurality of gateways, the data transfer policies are used to determine, based on information provided from the user, whether a certain public cloud storage element is accessible to the user.

6. The secure exchange system of claim 1, wherein the computing device comprises a secure data transfer logic being a software tool that provides the user with control into which public cloud storage element an object from a particular on-premises computing device is to be stored and from which public cloud storage element an object is retrieved for return to the computing device.

7. The secure exchange system of claim 6, wherein the dedicated communication link is a Direct Connect link and each of the public cloud storage elements includes a Simple Storage Service (S3) bucket provided by a public cloud network corresponding to AMAZON WEB SERVICES.

8. The secure exchange system of claim 1, wherein each public cloud storage element appears as a mounted local directory of each gateway of the plurality of gateways.

9. The secure exchange system of claim 1, wherein each local directory is assigned a same name as assigned to the public cloud storage element or a substantially similar name as the public cloud storage element that includes the same name with additional added characters or removal of a number of characters from the same name.

10. The secure exchange system of claim 1, wherein each of the one or more objects corresponds to (i) a file or (ii) a document or (iii) a portion of software or (iv) an image.

11. The secure exchange system of claim 1, wherein the controller is configured to be operating functionally with each gateway of the plurality of gateways, but is separate from the plurality of gateways.

12. The secure exchange system of claim 1, wherein each gateway of the plurality of gateways operates as a software instance deployed at least partially within a public cloud network for example, where each gateway of the plurality of gateways is at least configured to control a flow of data traffic from a resource to the public cloud storage service.

13. A secure exchange system comprising:
   a computing device deployed within an on-premises network and communicatively coupled to a virtual private cloud network;
   the virtual private cloud network including a plurality of gateways, each gateway of the plurality of gateways is configured to generate routing logic and one or more local directories, wherein each local directory of the one or more local directories is within a gateway and uniquely corresponds to a public cloud storage element of a plurality of public cloud storage elements forming a public cloud storage service; and
   a controller communicatively coupled to each of the plurality of gateways to restrict access to at least one local directory of the one or more local directories in response to a failure to authenticate a user,
   wherein the controller is configured to create a virtual private cloud (VPC) endpoint within a public cloud network infrastructure being logic that (i) enables resources external from the secure exchange system to access the plurality of public cloud storage elements via the one or more local directories, (ii) maintains a transfer of data only between the one or more local directories
   and the plurality of public cloud storage elements within the public cloud network infrastructure and (iii) prevents the transfer of data outside the public cloud network infrastructure and over an Internet connection,
   wherein the routing logic is configured to communicate information associated with an incoming message relating to a storage element of the plurality of public cloud storage elements from the on-premises network and generate an inter-cloud message to access the storage element of the plurality of public cloud storage elements via the VPC endpoint,
   wherein the generated inter-cloud message is between one of the local directories and the storage element.

14. The secure exchange system of claim 13, wherein the virtual private cloud network further comprises a gateway selector to select a gateway of the plurality of gateways to apply a load balancing scheme directed toward communication sessions from the on-premises network to the plurality of public cloud storage elements forming the public cloud storage service.

15. The secure exchange system of claim 14, further comprising a dedicated communication link between the on-premises network and a cloud gateway of a public cloud network in which the virtual private cloud network resides, the cloud gateway communicatively coupled to the gateway selector.

16. The secure exchange system of claim 1, wherein the controller is configured to further maintain and provide data transfer policies to each of the plurality of gateways, the data transfer policies are used to determine, based on information provided from the user, whether a certain public cloud storage element is accessible to the user.

17. The secure exchange system of claim 13, wherein each public cloud storage element is a mounted local directory of each gateway of the plurality of gateways.

18. The secure exchange system of claim 13, wherein each local directory is assigned a same name as assigned to the public cloud storage element or a substantially similar name as the public cloud storage element that includes the same name with additional added characters or removal of a number of characters from the same name.

19. The secure exchange system of claim 13, wherein each gateway of the plurality of gateways operates as a software instance deployed at least partially within a public cloud network for example, where each gateway of the plurality of gateways is at least configured to control a flow of data traffic from a resource to the public cloud storage service.

* * * * *